(12) United States Patent
Nair et al.

(10) Patent No.: US 12,498,958 B1
(45) Date of Patent: Dec. 16, 2025

(54) CAMPAIGN WATCHER

(71) Applicant: MOENGAGE INC., San Francisco, CA (US)

(72) Inventors: Ajish Nair, Pune (IN); Sumit Bansal, Jaipur (IN); Yashwanth Kumar, Bangalore (IN); Mohit Baranwal, Bangalore (IN)

(73) Assignee: MOENGAGE INC., San Francisco, CA (US)

( * ) Notice: Subject to any disclaimer, the term of this patent is extended or adjusted under 35 U.S.C. 154(b) by 0 days.

(21) Appl. No.: 18/956,414

(22) Filed: Nov. 22, 2024

(30) Foreign Application Priority Data

Aug. 16, 2024 (IN) .............................. 202411062280

(51) Int. Cl.
*G06F 9/455* (2018.01)

(52) U.S. Cl.
CPC ..................... *G06F 9/45558* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 10,996,984 B1* | 5/2021 | Jonsson | G06F 9/5066 |
| 2023/0267507 A1 | 8/2023 | Chaar et al. | |
| 2023/0353525 A1* | 11/2023 | Timmons | H04L 51/224 |
| 2024/0103923 A1* | 3/2024 | Regge | G06F 9/505 |

FOREIGN PATENT DOCUMENTS

JP 2023102225 A 7/2023

* cited by examiner

*Primary Examiner* — Bradley A Teets
*Assistant Examiner* — Melissa A Headly
(74) *Attorney, Agent, or Firm* — Jason A. Smith; Shumaker, Loop & Kendrick, LLP

(57) ABSTRACT

A method and system for sending a campaign to a set of users is disclosed. The method comprises receiving a request to send the campaign to the set of users. The set of users into are segmented into a plurality of batches. Each batch comprises at least a predetermined number of users from the set of users. The campaign is processed for the plurality of batches using one or more virtual machine instances. Furthermore, an auto-healing process is implemented to periodically monitor a processing status of the campaign across the plurality of batches. Further, one or more pending batches are identified from the plurality of batches for which the campaign has not been processed. Further re-initiating processing of the campaign for the identified one or more pending batches is performed. The campaign to the pending one or more batches of the plurality of batches is transmitted.

17 Claims, 5 Drawing Sheets

CAMPAIGN WATCHER

PRIORITY INFORMATION

The present application claims priority from Indian application no. 202411062280 dated Aug. 16, 2024.

TECHNICAL FIELD

The present subject matter described herein, in general, relates to sending a campaign to a set of users associated with corresponding user devices.

BACKGROUND

In large-scale notification systems, ensuring that every notification/campaign is reliably sent to end users is paramount. The technical challenge arises from the need to balance scalability and cost-efficiency. Auto Scaling Groups (AWS) and spot instances are employed to dynamically scale resources based on load, optimizing costs by using spot instances, which are significantly cheaper than on-demand instances. However, the temporary nature of spot instances can result in interruptions, leading to batches of campaign being missed or only partially sent. This necessitates a system that can detect these missed batches and automatically retry sending them after a safe period, ensuring 100% campaign delivery. The absence of such a system makes it difficult to guarantee campaign reliability using the current infrastructure.

Currently, the problem of ensuring the delivery of every campaign is managed by leveraging AWS in conjunction with spot instances. This setup allows for automatic scaling of resources: instances are added to handle increased load and removed when the load decreases, thereby optimizing costs. When a campaign is generated, the system scales up the number of EC2 instances to process and send these campaigns. If the load drops, the system scales down to save costs. This approach is economically advantageous as spot instances are significantly cheaper than on-demand instances. However, this cost efficiency comes at the risk of AWS reclaiming spot instances without warning, which can disrupt the campaign sending process, leading to incomplete or missed campaign. To mitigate this, some organizations use on-demand instances despite their higher costs, as they provide more stability. However, even this does not fully solve the problem, especially if there are internal service degradations that can also cause campaign delivery failures.

However, the current solutions face several technical challenges and shortcomings: 1. Unreliable Spot Instances: Spot instances, while cost-effective, can be reclaimed by AWS at any moment, which can interrupt the campaign sending process. This unreliability means that some campaign may never be sent or may only be partially sent, compromising the effectiveness of the campaign. 2. High Cost of On-Demand Instances: The alternative to using spot instances is on-demand instances, which are 3-4 times more expensive. This significantly increases operational costs and is not a viable option for many businesses, especially those with tight budgets. 3. Lack of Automatic Retry Mechanisms: There is currently no existing system that can automatically detect missed batches and retry sending them after a safe period. This means that missed notifications require manual intervention or may go unnoticed, resulting in incomplete user communication. 4. Service Degradation: Even with on-demand instances, any degradation in internal services (e.g., database issues, network problems) can lead to failures in the campaign sending process. This adds another layer of complexity and potential failure points that are not adequately addressed by current solutions. 5. Resource utilization inefficiency: On-demand instances may lead to over-provisioning of resources during low-traffic periods, resulting in unnecessary costs and underutilized infrastructure. In summary, the current solutions are either too costly or too unreliable, and they lack a robust mechanism to ensure 100% delivery of notifications. This highlights the need for a new system that can provide both cost efficiency and reliability by dynamically managing resources and implementing automatic retry mechanisms for missed campaign.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for sending a campaign to a set of users associated with corresponding user devices. This summary is not intended to identify essential features of the claimed subject matter nor is it intended for use in determining or limiting the scope of the claimed subject matter.

In one implementation, a method for sending a campaign to a set of users associated with corresponding user devices is disclosed. The method comprises receiving a request to send the campaign to the set of users. The set of users into are segmented into a plurality of batches. The plurality of batches is based on a target criterion. Each batch comprises at least a predetermined number of users from the set of users. Further, the campaign is processed for the plurality of batches using one or more virtual machine instances. Furthermore, an auto-healing process is implemented to periodically monitor a processing status of the campaign across the plurality of batches. Upon detecting a processing interruption based on the processing status, one or more pending batches are identified from the plurality of batches for which the campaign has not been processed. Further re-initiating processing of the campaign for the identified one or more pending batches is performed. The campaign to the pending one or more batches of the plurality of batches is transmitted.

In yet another implementation, a system for sending a campaign to a set of users associated with corresponding user devices is disclosed. The system comprises a memory storing one or more instructions. The memory is communicatively couped to a processor. The processor upon execution of the one or more stored instructions is configured to receive a request to send the campaign to the set of users. The set of users are segmented into a plurality of batches. The plurality of batches is based on a target criterion. Each batch comprises at least a predetermined number of users from the set of users. Further, the campaign is processed for the plurality of batches using one or more virtual machine instances. Furthermore, an auto-healing process is implemented to periodically monitor a processing status of the campaign across the plurality of batches. Upon detecting a processing interruption based on the processing status, one or more pending batches are identified from the plurality of batches for which the campaign has not been processed. Further re-initiating processing of the campaign for the identified one or more pending batches is performed. The campaign to the pending one or more batches of the plurality of batches is transmitted.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for sending a campaign to a set of users associated with corresponding user devices is disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figures depict an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "segmenting", "transmitting", "implementing", "identifying", "processing", and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for sending a campaign to a set of users associated with corresponding user devices. In operation, a set of users are to be sent a particular type of campaign. The set of users is segmented into various batches. The campaign is processed across the various batches. Further, an auto healing process is implemented to determine if the campaign is being processed or it is interrupted. Upon detecting that the campaign is interrupted, the processing of campaign is re-initiated at a batch level and at a user level at which it was interrupted. The proposed method and system offer solutions to the technical issues identified in above paragraphs and provide various advantages, as will be clear from the following description.

Figure 1:
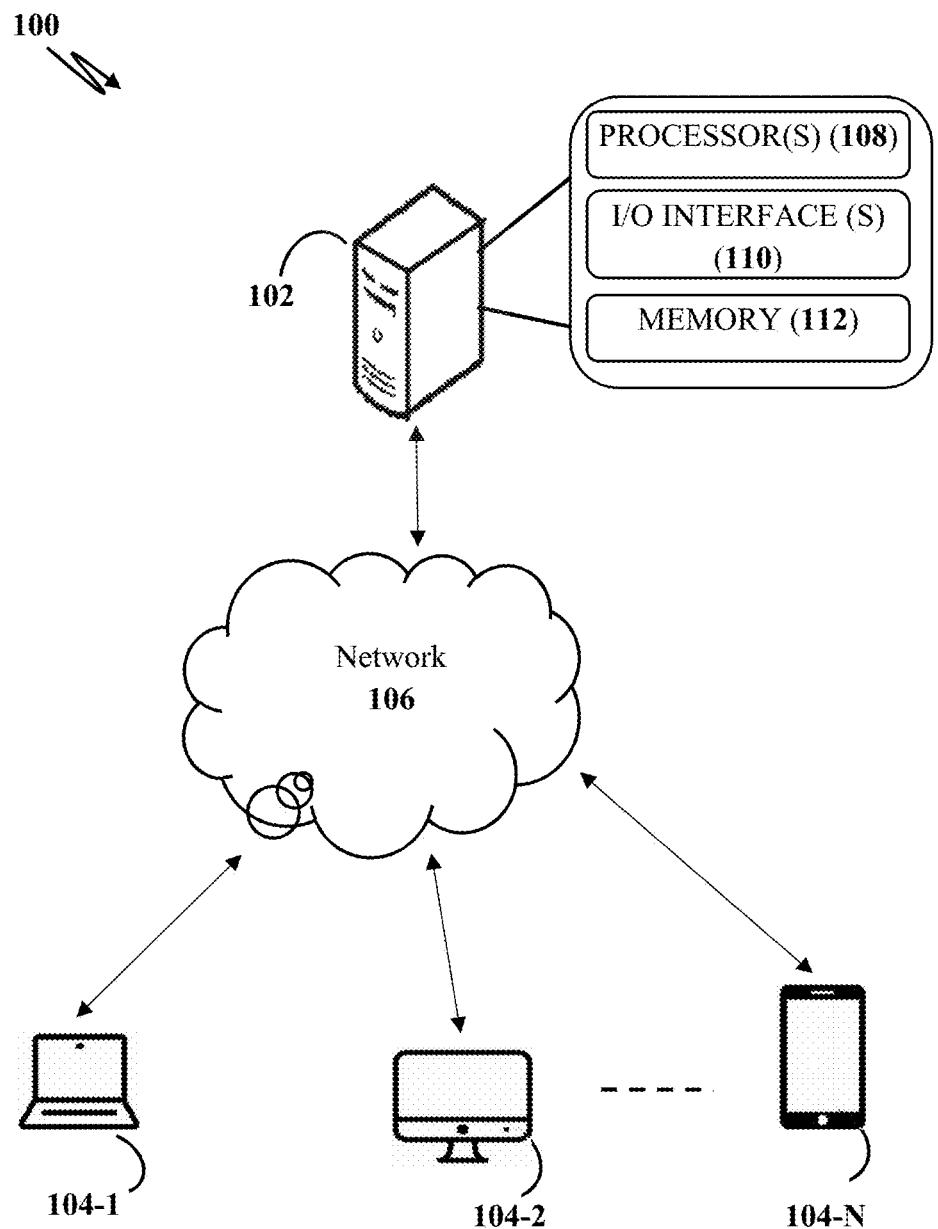
FIG. 1 illustrates a network implementation for sending a campaign to a set of users associated with corresponding user devices, in accordance with an embodiment of the present disclosure.

Referring now to FIG. 1, a network 100 implementation for sending a campaign to a set of users associated with corresponding user devices. The network 100 includes a system 102, one or more user devices 104-N (for example but not limited to one or more user devices 104-1, 104-2 . . . 104-N) associated with one or more users. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. In one implementation, the system 102 may be implemented in a cloud-based computing environment in which the system is configured to execute or interact with remotely located applications. Further, system 102 and user device 104 may communicate through the network 106. Examples of the user devices 104 may include, but are not limited to, a portable computer, a personal digital assistant, a handheld device, and a workstation.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, a memory 112, and one or more modules explained later in the description. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

Figure 2A:
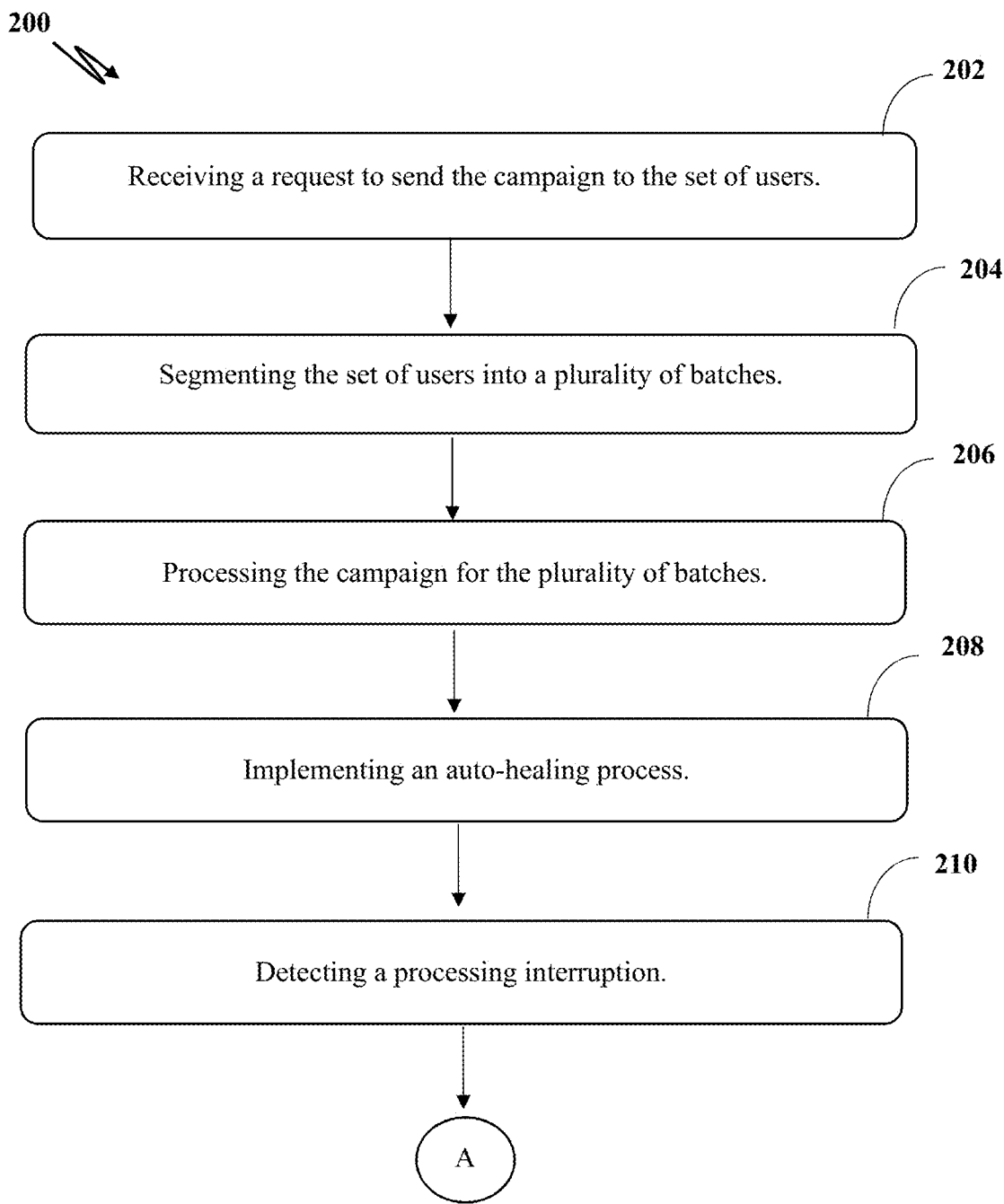
FIGS. 2A and 2B illustrate a block diagram for a method of sending a campaign to a set of users, in accordance with an embodiment of the present disclosure.
Figure 2B:
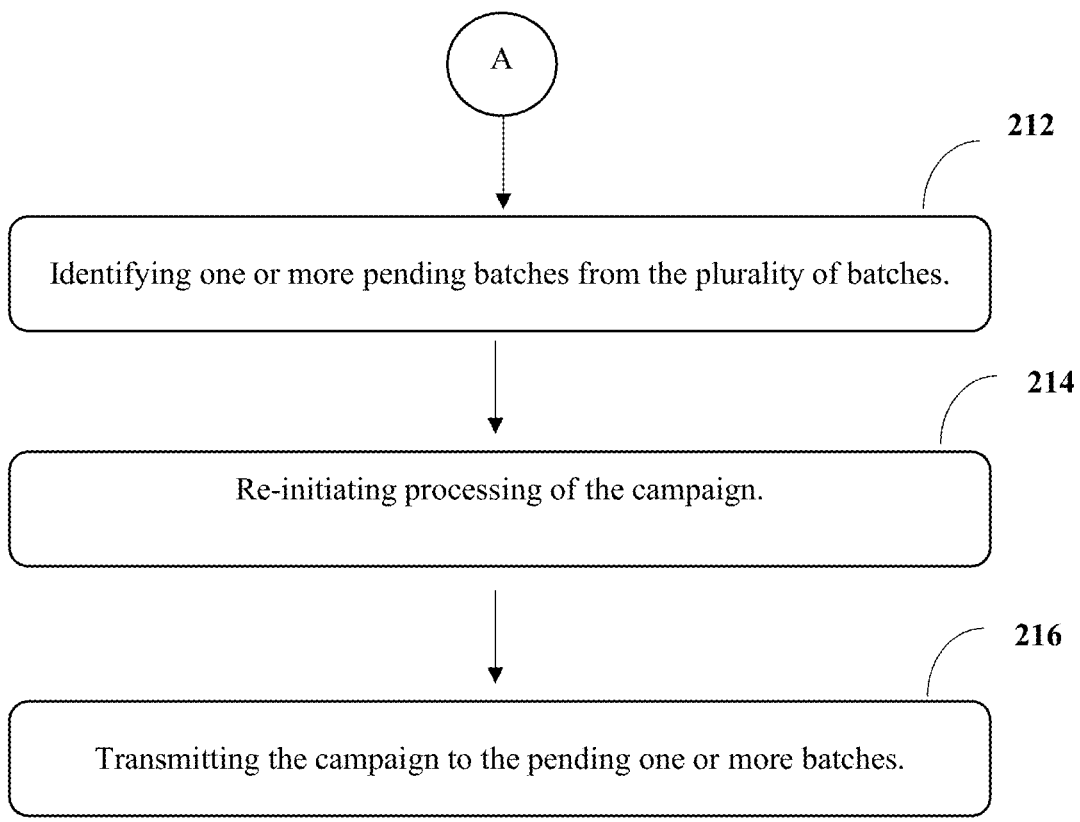

The detail functioning of the system 102 is described below with the help of FIGS. 2A and 2B. Referring now to FIGS. 2A and 2B, a detailed diagram of the network 100 comprising one or more components of the system interacting with the user device, via web or mobile applications. Referring now to FIGS. 2A and 2B, a method 200 for sending a campaign to a set of users associated with corresponding user devices, is shown, in accordance with one or more embodiments of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The method 200 for transmitting notifications may be implemented in any suitable hardware, software, firmware, or combination thereof. However, for ease of explanation, in the embodiments described below, the method 200 may be considered to be implemented in the network 100 of FIG. 1 by the processor(s) 108 of the system 102 in association with the other devices in the network 100.

At step 202, the system may be configured to receive a request to send a campaign to a set of users. The set of users may be associated with devices like any electronic device capable of sending requests and interacting with users, such as smartphones, tablets, wearables, smart speakers, personal computers, smart TVs, and IoT devices. In an embodiment, a campaign refers to a coordinated series of activities or messages aimed at achieving a specific goal, typically related to marketing, information dissemination, or user engagement. The primary objective of the campaign is to promote a product, service, event, or idea to a targeted audience to generate interest, awareness, or action. The campaign may include content which could be in the form of emails, advertisements, social media posts, notifications, etc. In an embodiment, the received request may include various items such as campaign content, user sets, and associated metadata. The campaign content may comprise a variety of elements such as text, images, videos, or any combination thereof. In some cases, the campaign content may be tailored to a specific audience or user set. The user sets may be defined based on a variety of parameters. For instance, the user sets may be defined based on demographic information, user preferences, user behaviour, or any combination thereof. In some cases, the user sets may be predefined, while in other cases, the user sets may be dynamically generated based on real-time data. The associated metadata may include information related to the campaign content and the user sets. For instance, the metadata may include information about the creation date of the campaign, the target audience, the expected duration of the campaign, or any other relevant information. In some cases, the metadata may be used to optimize the delivery of the campaign content to the user sets. In some aspect, the system may be configured to process the campaign request. This may involve validating the campaign content, verifying the user sets, and analysing the associated metadata. In some cases, the system may also be configured to generate a campaign plan based on the campaign request. This campaign plan may outline the steps for delivering the campaign content to the user sets, taking into account the associated metadata.

In an embodiment, at step 204, the system is configured to segment the set of users into a plurality of batches. Each of the batch may comprises at least a predetermined number of users from the set of users. Upon receiving the request, the system may determine a number of users to be segment into each batch. The number of users may be based on factors such as campaign objectives, resource capacity, delivery constraints, organizational requirements, and the like. In an embodiment, the system may receive the predetermined number of users in a request from a user requesting for sending campaign. The system may segment the set of users into plurality of batches based on a target criterion. The target criteria may include one or more of: demographics, behaviour, personal preferences, devices being used, transactional factors, historic data, engagement level, and the like. For example, users following under a criterion like living at a same geographic location can be segmented into one batch. The system may segment the set of users into one or more batches using one or more segmenting approaches. The segmenting approach may include sequential segmentation where the system may divide the set of users into consecutive groups of a predetermined size. In yet another embodiment, the system may use random segmentation, where the system may assign the set of users to batches to ensure diversity within each batch. In yet another embodiment, the system may use attribute-based segmentation, where the system may group users with similar attributes together to create more targeted batches. The attributes may include, age, gender, income, location, interests, and the like. In an embodiment, after segmentation if a final batch has fewer than a predetermined user, the system may be configured to combine the last batch with the previous one, resulting in X batches of N users and 1 batch of Y users. In yet another embodiment, the system may redistribute users to ensure each batch is as close to N users as possible without falling below the minimum.

In an embodiment, at step 206, the system may process the campaign for the plurality of batches using one or more virtual machine instances. The processing may include one or more actions required to deliver the campaign content to each batch of users, ensuring the campaign reaches the intended user in an organized and effective manner. In an embodiment, the system may process baches in a sequential manner. The batches may be processed via a processing que. In yet another embodiment, the batches may be processed in a parallel manner. In an embodiment, the processing of the campaign across the batch may include one or more steps like batch creation, batch deduplication, frequency caping, batch sending, tracking the batches, monitoring the batches, and the like.

In an embodiment, the one or more virtual machine instances are scaled up or scaled down based on a predetermined number of the plurality of batches to be processed. For example, the system may scale up (increase the number of VM instances) when there are more batches to process than the current VM instances can handle efficiently. For example, if a predetermined threshold is 10 batches per VM, and the campaign suddenly increases to 50 batches, the system may be configured scale up from 2 VMs to 5 VMs to maintain optimal processing speed. In yet another example, conversely, the system may scale down (decrease the number of VM instances) when there are fewer batches to process than the current VM setup requires. Using the same example, if the number of batches drops from 50 to 20, the system may scale down from 5 VMs to 2 VMs, as this would be sufficient to handle the reduced workload efficiently.

In an embodiment, the scaling process of the virtual machine instances may be based on a predetermined number of batches that acts as a threshold. In yet another embodiment, the scaling process may be based on factors like VM capacity, batch complexity, and processing time. The scaling process is dynamic and responsive to the changing number of batches. The system continuously monitors the number of batches in the processing queue. When this number crosses the predetermined threshold in either direction, the system initiates the scaling process. Scaling up involves creating and deploying new VM instances, while scaling down involves completing any remaining tasks on a VM and then shutting it down. This scaling methodology enables optimal utilization of resources. To ensure optimal processing speed and fulfil deadlines, the system can enhance performance by scaling up the number of virtual machine (VM) instances during moments of high demand. By reducing the number of virtual machine instances during periods of low demand, it preserves computational resources and lowers operational expenses. This dynamic scaling guarantees that the system is consistently optimized for the present workload.

In an embodiment, scaling mechanism may use various metrics to determine the workload. These metrics may include, but are not limited to, the number of campaigns to be processed, the size of the campaign data, the complexity of the campaign analysis, and the urgency of the campaign reports. In some cases, the scaling mechanism may be configured to predict future workloads based on historical data. This predictive capability may allow the scaling mechanism to proactively adjust the number of active virtual machine instances before a change in workload occurs, potentially improving the efficiency and responsiveness of the campaign processing system. In some aspects, the virtual machine instances and the scaling mechanism may be implemented using various technologies. For example, the virtual machine instances may be implemented using cloud computing platforms, and the scaling mechanism may be implemented using machine learning algorithms. However, other technologies may also be used without departing from the scope of the campaign processing system.

In an embodiment, at step 208, the system may implement an auto-healing process to periodically monitor a processing status of the campaign across the plurality of batches. The system may be configured to periodically monitor the processing status of a campaign across multiple batches after a specific time interval. In an embodiment, the system may include an auto-healing process for monitoring campaign processing status across batches and at individual user levels. This process may involve the system periodically checking the status of each batch and individual user within a campaign. For instance, the system may check if a batch has been processed successfully or if an individual user has received the intended campaign content. In some cases, the system may identify any issues or errors that occur during the campaign processing. These issues may include, but are not limited to, network errors, processing errors, or user-specific errors. Upon identifying an issue, the system may initiate an auto-healing process to rectify the identified issue. This process may involve reprocessing the affected batch or resending the campaign content to the affected user. In some embodiments, the auto-healing process may be automated, requiring minimal to no manual intervention. This may allow for efficient and timely resolution of issues, ensuring the smooth operation of the campaign processing. In other cases, the system may provide notifications or alerts to the operators or administrators about the identified issues and the initiated auto-healing process. This may enable the operators or administrators to monitor the campaign processing status and take necessary actions if required. In some cases, the system may maintain a log of the auto-healing process. This log may include information such as the identified issue, the initiated auto-healing process, and the outcome of the process. The system may use this log for future reference or for improving the efficiency of the auto-healing process. In some embodiments, the auto-healing process may be customizable. For instance, the operators or administrators may set the frequency of the status checks, the types of issues that trigger the auto-healing process, or the actions taken during the auto-healing process. This may allow the operators or administrators to tailor the auto-healing process according to the specific needs of the campaign processing.

In an embodiment, the system may periodically monitor the processing of the campaign based on the processing status. The system may update the processing status at each processing state in a database. The database at any time may indicate a current processing state of the processing. The system may continuously monitor the database to identify a number of batches being processed of the total number of batches.

In an embodiment, the system may assign identifier at batch level and user level. For example, the system may assign unique batch identifier to each batch and a unique identifier to each user corresponding to a respective batch. The system may monitor the processing of the campaign at both the levels, i.e. batch level and user level by using these unique identifiers. In an embodiment, each batch while processing goes from different stages like batch creation, batch start sending, batch duplication, batch frequency capping, and batch sending completed. Similarly, each user in the processing stage goes through different stages of user creation and user processed. The system monitors and tracks each stage of processing at the batch level and user level and accordingly update the status in the database. This is explained with the help of following example:

Each batch is assigned a unique identifier (Batch 1, Batch 2, etc.) and user Identifier (User 1, User 2). Each batch's status is initially set to 'Batch Created' (0). Each batch goes through the following major steps in the sending process: A. Start sending: the system begins the process of sending campaign for a batch. The system may update the status of the batch to 'Batch Started' (1). For example, the system may capture the status information, in the database, in a format like batch __{campaign}_{batch_number}{processing status}. Let's say in this case the Batch 0 starts processing, and the status may be captured in the database as batch_1234_0 1. In this case, the processing status is 1 which means that the batch is at the first stage of start sending. B. Deduplication Removal: the system checks for and removes any duplicate user entries within the batch to ensure each user receives the intended campaign only once. The system may update the status to 'Batch Deduplication Done' (2). For example, the system may log the status information in a format like batch_1234_0 2. In this case the '2' may indicate the second stage of the processing i.e. batch deduplication done. C. Frequency Capping: the system ensures that users do not receive messages too frequently based on predefined rules or limits. The batch status is updated to 'Batch Frequency Capping Done' (3). Example: Batch 1 is checked for frequency capping rules, ensuring users are not messaged too often. For example, the system may log the status information in a format like the status is updated to batch_1234_1 3. D. Sending Completed: the system sends out the campaign messages to all the users in the batch. The system may confirm that all messages have been sent successfully. The batch status is updated to 'Batch Sending Done' (4). For example, the system may log the status information in a format like the status is updated to batch_1234_0 4. In an embodiment, the system may log the information at user level. For example, if a user corresponding to a batch is assigned (0), the system may log the status information as user_{campaign}_{user_id}{processing stage}, like user_1234_2 0. In an embodiment, when a campaign across a user is processed (1) the system may update and log the status as user_1234_2 1.

In an embodiment, to frequency cap, the system may track each user's interaction and message reception history using user-specific logs or records, stored in a database or a key-value store. In an embodiment, the received request at step 202 may include frequency capping rules per campaign or per batch, specifying limits such as 'no more than 1 message per day' or 'no more than 3 messages per week' for each user. In yet another embodiment, if the received request did not include the frequency capping rules, the system may be configured to specify the limits to a predetermined number. In an embodiment, if the system determines that the user has reached their defined limit of receiving campaign, the system may skip sending the campaign or delay the campaign to a next allowed time slot.

In an embodiment, to remove duplications, the system may be configured to perform hashing. Duplication removal is a crucial step in campaign management to ensure that users are not burdened with multiple identical messages. For example, the system creates multiple batches of users, and each user is assigned a unique user identifier. The system may store the user identifiers in a hash table by calculating corresponding hash values for each user identifier. As the system processes each user record, the system may calculate the hash value of the user's unique identifier and checks the hash table. If the identifier is not found in the hash table, the user is added, and the identifier is inserted into the table. On the other hand, if the identifier is already present in the hash table, the user record is flagged as a duplicate and excluded from further processing. In an embodiment, the system may dynamically update the hash table as the batches are processed. In an embodiment after deduplication is performed, the system may compile a list of unique users for campaign sending. The system may send out the campaign to the list of unique users. The system updates the status of each batch to 'Sending Completed' once the campaigns are sent.

In an embodiment, monitoring the processing status includes, determining if a number of the one or more virtual machine instances is less than a predetermined threshold for processing the campaign across the plurality of batches; and detecting interruption in processing a respective batch of the plurality of the batches, based on the determination. At step 210, the system is configured to detect an interruption occurring to the processing of the batch. The system may detect the interruption based on the processing status of the batch. For example, the auto healing process monitors periodically to detect if the campaign processing for a batch takes time greater than a predetermined time. If the campaign processing takes time greater than the predetermined time, the system determines that there have been interruptions in processing the specific batch. Once the system detects that the processing time has been greater than the predetermined time, the system determines a level at which the interruption has occurred based on the processing status. For example, the system determines that at what user level and at what batch level the interruption has been occurred based on the processing status. In some cases, the system may also be configured to detect errors in the batch processing. This could involve the system checking the output of each batch against expected results. If the output does not match the expected results, the system may identify this as an error. In other aspects, the system may use different methods to identify delays or errors. For example, the system may analyse the log files generated during batch processing. These log files may contain information about the processing time and output of each batch. By analysing these log files, the system may be able to identify any anomalies that indicate a delay or error. In some embodiments, the system may use machine learning algorithms to improve its ability to detect delays or errors. These algorithms may be trained on historical batch processing data and may be able to identify patterns that indicate a potential delay or error.

At step 212 upon detecting a processing interruption based on the processing status, the system may be configured to identify one or more pending batches from the plurality of batches for which the campaign has not been processed. At each interval, the system may collect data on the processing status of each batch, including progress, completion, interruptions, and any encountered errors. In an embodiment, the system detects interruption in processing based on if a batch takes longer than the predefined time to process or if a batch encounters a system error. When an interruption is detected, the system may generate an alert and logs the interruption details in a database. The system may mark the batches as 'pending' or 'in progress', in the database. Upon detecting an interruption, the system queries the database to identify which batches have not been fully processed. The system may filter out batches that are still marked as 'pending' or 'in progress.' In an embodiment, the system may generate a report listing all pending batches, including details such as batch ID, current status, and reason for interruption (if available).

In an embodiment, at step 214, the system may be configured to re-initiate processing of the campaign for the identified one or more pending batches. In some embodiments, the system may be configured to identify pending batches after an interruption. This process may involve the system scanning the batch processing queue to identify any batches that were in the process of being processed at the time of the interruption. The system may then mark these batches as pending, indicating that they have not yet been fully processed. The system may re-initiate the processing of the campaign at a batch level and user level where the interruption in processing happened. In an embodiment, at step 210, upon detecting the interruption, the system may capture the status of the campaign at batch level and at user level. For example, at the time of interruption a batch being processed was at frequency capping level. The system may capture the previous status of the batch as batch_1234_0 2 (as discussed in above example), because the frequency capping for that batch has been interrupted. This would basically indicate that deduplication for this batch has been done and at the time of re-initiation, frequency capping should be performed for this batch. In another example, if the interruption occurred at deduplication removal stage, the system re-runs the deduplication algorithms. Further, the system may also capture the status information at user level to determine which user was being processed at the time of interruption. The system may log this status information in a data based at the time of interruption. At step 212, the system may retrieve the status information at batch level and user level form the database and re-initiate the steps of processing from the process at which the interruption occurred. In an embodiment, the system may determine if a number of VM instances are above a predetermined threshold to re-initiate the batch processing. The system efficiently re-initiates the processing of pending batches, ensuring minimal disruption and timely completion of the campaign.

In some cases, the system may also be configured to re-initiate campaign processing for these pending batches. This may involve the system resuming the processing of the pending batches from the point at which the interruption occurred. The system may use the data associated with each batch, such as the batch ID and the last processed record, to determine the point at which to resume processing. In other cases, the system may be configured to re-initiate campaign processing for pending batches by restarting the processing of the batches from the beginning. This may be particularly useful in situations where the data in the batch may have changed during the interruption, or where the processing algorithm may have been updated. In yet other cases, the system may be configured to re-initiate campaign processing for pending batches by discarding the batches and re-creating them. This may be particularly useful in situations where the interruption was caused by an issue with the batches themselves, such as a data corruption issue. In some embodiments, the system may be configured to perform a combination of these methods for re-initiating campaign processing for pending batches. The specific method or combination of methods used may depend on a variety of factors, such as the nature of the interruption, the type of data in the batches, and the specific requirements of the campaign.

In an embodiment, at step 216, the system may be configured to transmit the campaign to the pending one or more batches of the plurality of batches. The system may transmit the campaign to the pending batches of users after the re-initiation process. This transmission may occur through various communication channels, such as email, mobile notifications, or web-based notifications. In an embodiment, the system may update the database with the current status of the batches at user level and at batch level to reflect the current status of a respective batch. The database may store information about the status of each campaign, such as whether it has been processed, whether it has been transmitted, and whether it has been received by the user. The status update may be performed by the system. In some cases, the system may be configured to automatically update the status of the campaigns in the database after the system has transmitted the campaigns. In an embodiment, when the processing of the batches is not interrupted the system may be configured to transmit the processed campaign to the plurality of the batches to the respective users.

Figure 3:
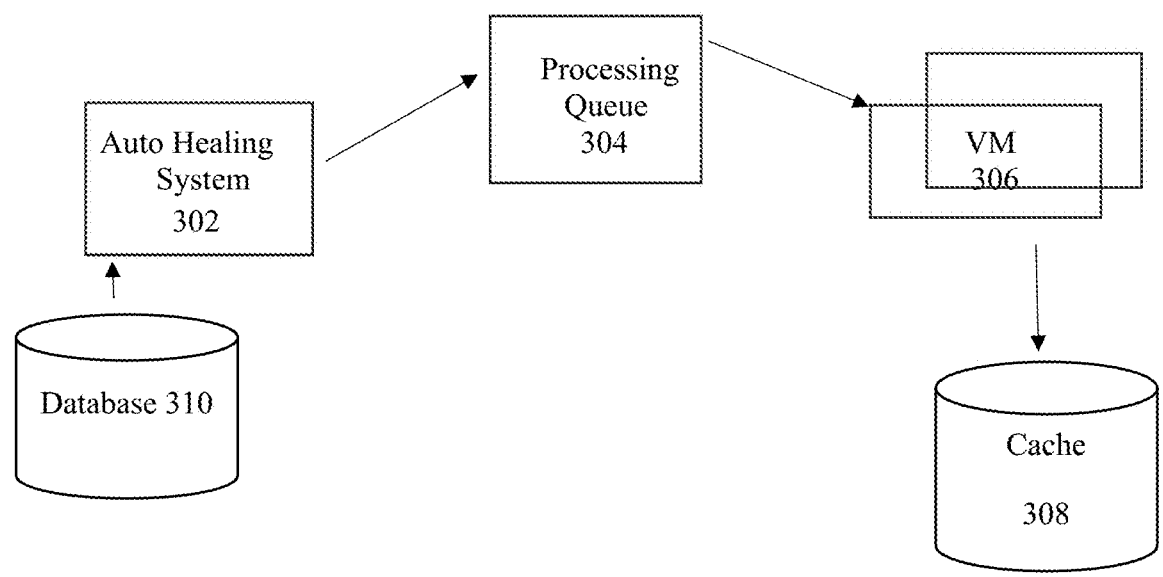
FIG. 3 illustrating processing of batches, in accordance with an embodiment of the present disclosure.

FIG. 3 represents an exemplary embodiment showing interaction between one or more modules for sending the campaign to the plurality of batches. The auto healing process at 302 may be a scheduler, which may run at a predetermined time to continuously monitor the status of the batches being processed. For example, the scheduler may run every 30 minutes and identify one or more campaigns that are sent or are in a sending state in the last 24 hours. The auto healing process may determine a number of batches in total and out of which how many have been processed, from the database 310. The system may update status of processing of each batch at user level and at a batch level in the database 310. The batches are transmitted to the processing queue 304 for being processed in a sequential manner. The processing of the batches is being performed using virtual machine (VM) instances 306. The VM's are dynamically created, as discussed above, based on the number of batches to be processed. After the batches are processed, the information regarding the status of batches is saved in the cache 308. In case of any interruptions also the processing status of the batches remains in the cache for a predetermined time period. In an embodiment, the database 310 may be stored in the cache 308.

Figure 4:
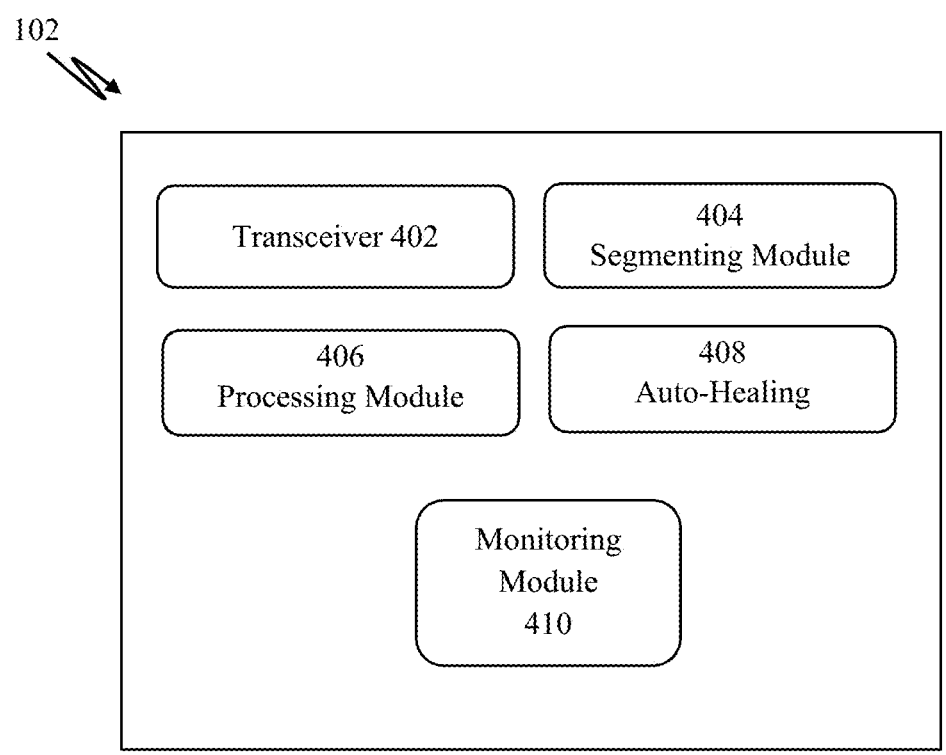
FIG. 4 illustrates one or more modules, in accordance with an embodiment of the present disclosure.

Referring to FIG. 4 now, the memory 112 of the system 102 comprises one or more module or structural components to perform the one or more steps defined in FIG. 2. In an embodiment, the request to send the campaign to the set of users is received via a transceiver 402. The secure intake of the request is facilitated by the transceiver 402, which acts as a first point of contact between a requester and the system. In an embodiment, the set of users is segmented into plurality of the batches using the segmenting module 404. Further, the campaign for the plurality of batches is processed using the processing module 406. The processing module may include one or more virtual machines to perform the processing. Following the processing, the system implements an auto-healing process via an auto-healing module 408. Further, the system may detect the interruption in the processing via the detecting module 410. Furthermore, the system may re-initiate the processing via the processing module 406. Finally, the campaign is being transmitted to the plurality of baches via the, via transceiver 402. In an embodiment, the system may continuously track status of the processing of the batches via the monitoring module 410.

The system and method disclosed in the present invention, for securely transmission of data has a variety of applications, for example but not limited to:
1. E-commerce Platforms: Ensuring promotional campaigns and notifications about sales and discounts are reliably delivered to all users, boosting customer engagement and sales.
2. Social Media Networks: Sending updates, messages, and notifications about user activity (likes, comments, shares) without interruption, enhancing user experience and engagement.
3. Financial Services: Delivering critical notifications such as transaction alerts, security updates, and promotional offers to customers without fail, ensuring compliance and customer satisfaction.

4. Healthcare Systems: Sending appointment reminders, health tips, and critical medical notifications reliably to patients, improving patient care and operational efficiency.
5. Education Platforms: Distributing announcements, assignment reminders, and course updates to students and educators, ensuring uninterrupted communication in virtual learning environments.
6. Gaming Applications: Providing timely notifications about in-game events, updates, and promotions to maintain user engagement and drive monetization.
7. IoT and Smart Home Devices: Ensuring that alerts and notifications from smart home devices (e.g., security alerts, maintenance reminders) are reliably delivered to users, enhancing security and convenience.

Exemplary embodiments discussed above may provide certain advantages. Though not required to practice aspects of the disclosure, these advantages may include those provided by the following features.

1. Reliable Delivery: The system ensures 100% delivery of notifications and campaigns by detecting missed batches and automatically retrying them, overcoming the interruptions caused by spot instances.
2. Cost Efficiency: By dynamically managing resources and utilizing cost-effective spot instances alongside on-demand instances, the system optimizes operational costs without sacrificing reliability.
3. Scalability: The system can automatically scale resources up or down based on load, efficiently handling high volumes of notifications during peak times and reducing costs during low-traffic periods.
4. Automatic Retry Mechanism: With built-in automatic retry mechanisms, the system can identify and resend missed notifications, reducing the need for manual intervention and ensuring complete user communication.
5. Service Degradation Management: The system is designed to handle internal service degradations, ensuring that campaign delivery is not affected by issues such as database or network problems.
6. Resource Utilization Efficiency: By balancing the use of spot and on-demand instances, the system prevents over-provisioning of resources, reducing unnecessary costs and improving infrastructure utilization.
7. Enhanced User Experience: Reliable and timely delivery of notifications ensures that users receive critical information without delays, enhancing their overall experience and engagement with the platform.
8. Operational Resilience: The system's ability to manage resource allocation and handle interruptions ensures high availability and operational resilience, even in the face of unexpected disruptions.

Although implementations for methods and system for sending a campaign to a set of users is disclosed have been described in language specific to structural features and/or methods, it is to be understood that the appended claims are not necessarily limited to the specific features or methods described. Rather, the specific features and methods are disclosed as examples of implementations for sending a campaign to a set of users.

The invention claimed is:

1. A method for efficiently transmitting a campaign to a plurality of users associated with corresponding user devices by dynamically scaling one or more virtual machine instances, wherein the method comprises:
   receiving a request to send the campaign to the plurality of users;
   segmenting the plurality of users into a plurality of batches, wherein each batch comprises at least two or more users from the plurality of users, and wherein the plurality of batches is based on a target criterion, and wherein each batch is assigned a unique batch identifier and each user of the plurality of users is assigned a unique user identifier;
   processing the campaign for the plurality of batches using the one or more virtual machine instances, wherein the campaign is processed at a batch level according to each respective batch identifier and at a user level according to each respective user identifier;
   assigning a status to each respective batch identifier and to each respective user identifier at predetermined intervals;
   implementing an auto-healing process to detect an interruption in the processing by determining if processing the campaign takes time greater than a predetermined threshold, wherein the auto-healing process is implemented by periodic monitoring of the statuses assigned to each respective batch identifier and to each respective user identifier;
   upon detection of the interruption in the processing of the campaign, determining if the interruption has occurred at least one of: at the user level according to each respective user identifier and at the batch level according to each respective batch identifier;
   identifying at least one of: one or more pending batches from the plurality of batches based on a respective batch identifier assigned to each of the one or more pending batches and one or more users for which the campaign has not been processed based on a respective user identifier assigned to each of the one or more users for which the campaign has not been processed;
   re-initiating processing of the campaign for the identified at least one of the one or more pending batches and the one or more users, wherein processing of the campaign is re-initiated by scaling the one or more virtual machine instances to a number equal to the predetermined threshold; and
   transmitting the processed campaign to the one or more users.

2. The method of claim 1, wherein the processing of the campaign is indicated by a processing status comprising information indicating whether processing of the campaign has been interrupted or is continuing without interruption.

3. The method of claim 1, wherein the processing of the campaign is re-initiated at a level where the processing has been stopped for a respective batch.

4. The method of claim 1, wherein the one or more virtual machine instances are scaled up or scaled down based on a predetermined number of the plurality of batches pending for the processing.

5. The method of claim 1, comprising:
   assigning status to the plurality of batches indicating a progress of the processing of the campaign.

6. The method of claim 1, wherein a status at the batch level comprises information indicating a unique batch identifier and a number indicating a stage of the processing at the batch level.

7. The method of claim 1, wherein a status at the user level comprises information indicating a unique user identifier and a number indicating a stage of the processing at the user level.

8. The method of claim 5 further comprising:
   tracking periodically the progress of the processing of the campaign; and updating a status at the batch level and a status at the user level to indicate current stage of the processing.

9. The method of claim 1, wherein the processing of the batch includes one or more stages: batch creation, batch start sending, batch deduplication, batch frequency capping, and batch sending complete.

10. A system for efficiently transmitting a campaign to a plurality of users associated with corresponding user devices by dynamically scaling one or more virtual machine instances wherein the system comprises:
  a memory storing one or more instructions;
  a processor communicatively coupled with the memory, wherein the processor upon execution of the one or more instructions is configured to:
    receive a request to send the campaign to the plurality of users wherein the set of users is based on a target criteria;
    segment the plurality of users into a plurality of batches, wherein each batch comprises at least a two or more users from the plurality of users, and wherein each batch is assigned a unique batch identifier and each user of the plurality of users is assigned a unique user identifier;
    process the campaign for the plurality of batches using one or more virtual machine instances, wherein the campaign is processed at a batch level according to each respective batch identifier and at a user level according to each respective user identifier;
    assign a status to each respective batch identifier and to each respective user identifier at predetermined intervals;
    implement an auto-healing process to detect an interruption in the processing by determining if processing the campaign takes time greater than a predetermined threshold, wherein the auto-healing process is implemented by periodic monitoring of the statuses assigned to each respective batch identifier and to each respective user identifier;
    upon detection of the interruption in the processing of the campaign, determining if the interruption has occurred at least one of: the user level according to each respective user identifier and at the batch level according to each respective batch identifier,
    wherein determining includes identify at least one of: one or more pending batches from the plurality of batches based on a respective batch identifier assigned to each of the one or more pending batches and one or more users for which the campaign has not been processed based on a respective user identifier assigned to each of the one or more users for which the campaign has not been processed;
    re-initiate processing of the campaign for the identified at least one of the one or more pending batches and the one or more users, wherein processing of the campaign is re-initiated by scaling the one or more virtual machine instances to number equal to the predetermined threshold;
    transmit the processed campaign to the one or more users more batches of the plurality of batches.

11. The system of claim 10, wherein the processing of the campaign is indicated by a processing status comprising information indicating whether processing of the campaign has been interrupted or is continuing without interruption.

12. The system of claim 10, wherein the processing of the campaign is re-initiated at a level where the processing has been stopped for a respective batch.

13. The system of claim 10, wherein the one or more virtual machine instances are scaled up or scaled down based on a predetermined number of the plurality of batches pending for the processing.

14. The system of claim 11, wherein the processor is further configured to:
  assign status to the plurality of batches indicating a progress of the processing of the campaign.

15. The system of claim 10, wherein a status at the batch level comprises information indicating a unique batch identifier and a number indicating a stage of the processing at the batch level.

16. The system of claim 10, wherein a status at the user level comprises information indicating a unique user identifier and a number indicating a stage of the processing at the user level.

17. The system of claim 14, wherein the processor is further configured to:
  tracking periodically the progress of the processing of the campaign; and
  updating a status at the batch level and a status at the user level to indicate current stage of the processing.

* * * * *